April 30, 1963 H. W. STRAND 3,087,461
FEEDING DEVICE
Filed July 8, 1960 2 Sheets-Sheet 1

INVENTOR
Hans Walfrid Strand
by Albert L. Jacobs
Attorney

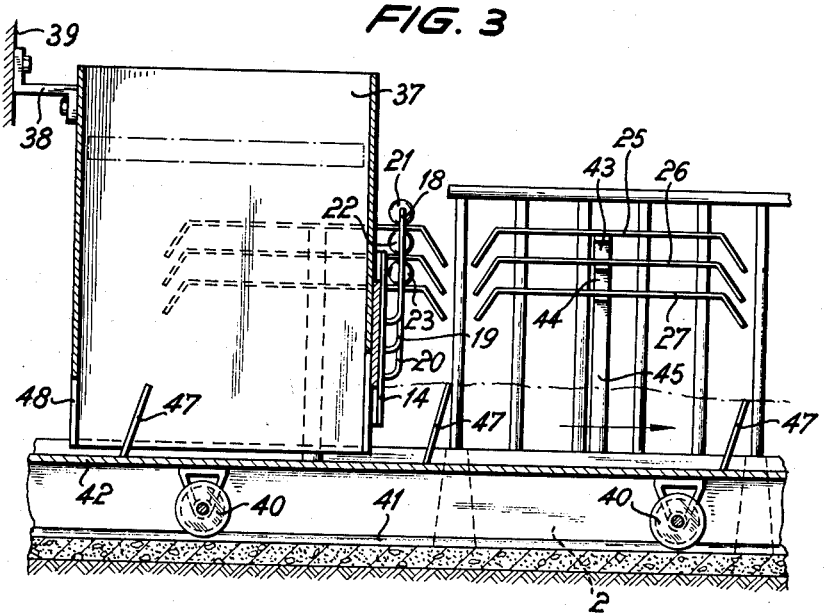
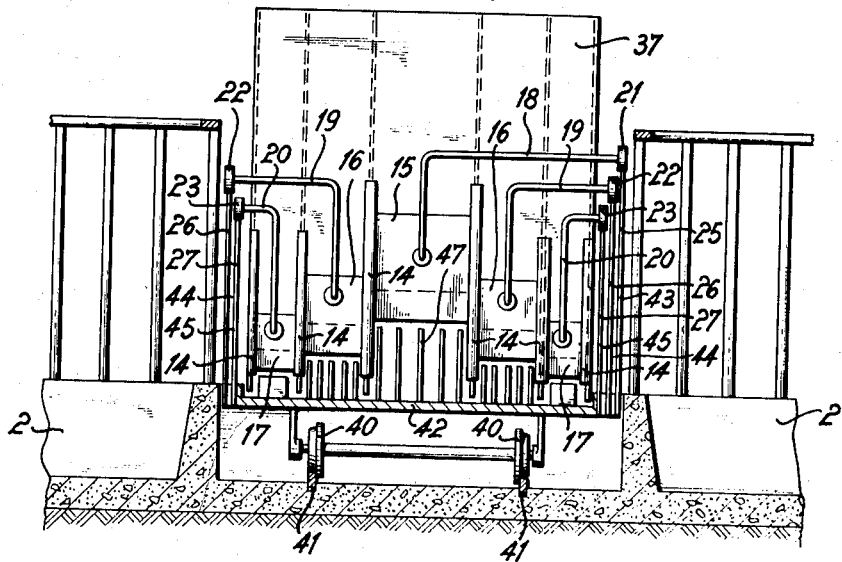

United States Patent Office 3,087,461
Patented Apr. 30, 1963

3,087,461
FEEDING DEVICE
Hans Walfrid Strand, Regementsgatan 64,
Malmo V, Sweden
Filed July 8, 1960, Ser. No. 41,523
9 Claims. (Cl. 119—52)

The present invention relates to a feeding device having a movable fodder container, which is divided into compartments for various kinds of fodder, and a stationary feeding table, or vice versa.

The invention is essentially characterized in that there are mounted at each compartment or on a movable fodder table preferably vertically and longitudinally adjustable, movable abutments which are intended to actuate movable doors shutting discharge openings in the fodder container when the fodder container passes the compartments or when the fodder table passes the fodder container, so that the size of the openings is automatically adjusted for discharging fodder portions which can be determined in advance for each animal and compartment, respectively.

When the device is provided with a stationary fodder container and a movable fodder table, the fodder container is open downwards and provided at the bottom of its wall opposite to the openings with vertical slots which are located in the paths of carriers for one or more of the kinds of fodder, said carriers projecting from the fodder table.

The invention is shown in the accompanying drawings wherein various embodiments are set forth by way of example.

FIG. 3 shows an installation having a stationary fodder container and a movable fodder table.

FIG. 4 is an end elevational view of FIG. 3.

Figure 1:
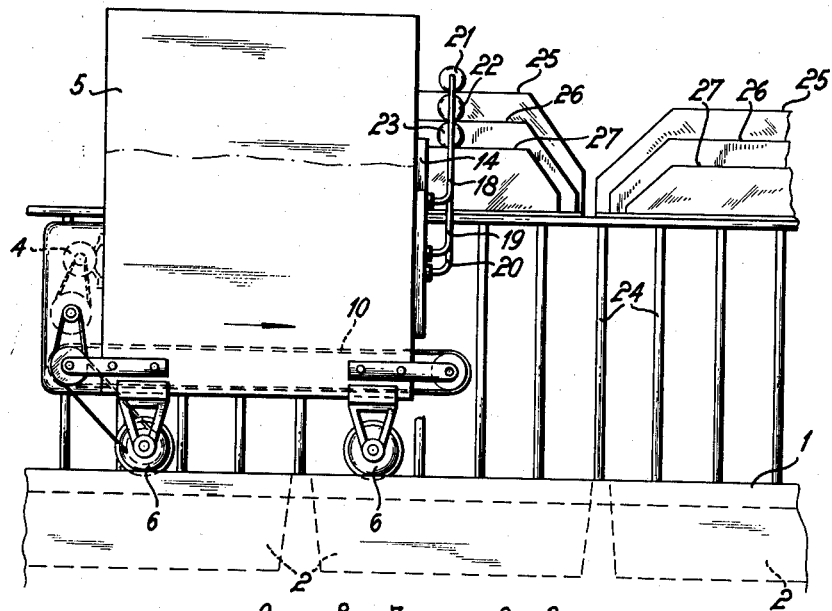
FIG. 1 shows an installation having a movable fodder container and a stationary fodder table.
Figure 2:
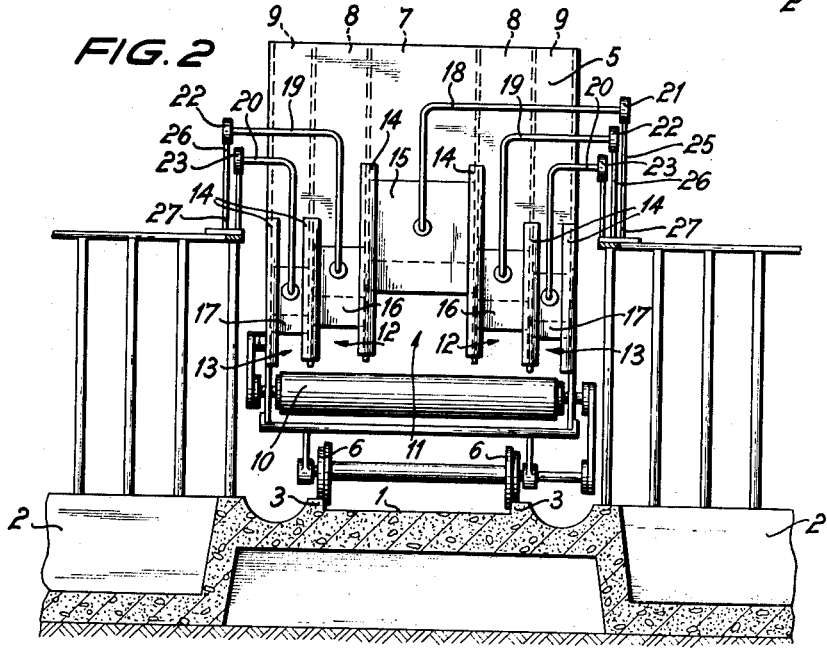
FIG. 2 is an end elevational view of FIG. 1.

In the embodiment according to FIGS. 1 and 2 reference numeral 1 designates the fodder table and reference numeral 2 designates the compartments disposed on both sides of the said table. This table is provided with longitudinal ribs 3 on which a fodder container 5 operated by a motor 4 runs by means of wheels 6 along the fodder table 1. As shown in FIG. 2, the fodder container 5 is divided into compartments for different kinds of fodder, viz. a large central compartment 7 for straw fodder and, on both sides of this compartment, smaller compartments 8, 9 for ensilage and concentrated fodder. An endless conveyor 10 driven by the motor 4 and disposed at the bottom of the fodder container 5, said conveyor being provided with carriers moving in the direction indicated by the arrow of FIG. 1, constitutes the bottom of the compartments 7, 8, 9. At the bottom of one end, each compartment 7, 8, 9 is provided with a discharge opening 11, 12, 13 of a suitable size. The openings 11, 12, 13 are closed by gates 15, 16, 17 which are vertically displaceable in guide rails 14 on the container. Each gate 15, 16, 17 is provided with a bar 18, 19, 20 bent laterally at right angles and reaching outside of the side of the container 5 and being provided at its free end with a pulley 21, 22, 23.

At each compartment 2 there are disposed U-shaped bows 25, 26, 27 above uprights 24 in the paths of the pulleys 21, 22, 23. The bows are removable and of variable length or stationary but adjustable vertically or longitudinally. The bows are pre-set according to the fodder portion determined for each animal. When the fodder container 5 passes the compartments 2 from the right to the left (FIG. 2), these bows will raise the gates 15–17 more or less so that a large or small quantity of fodder of each kind can be fed to the different animals.

FIGS. 3 and 4 show an embodiment having a stationary fodder container 37 which is fixed by means of fittings 38 to the end wall 39 of a cattle-shed. The fodder table is constructed as a wagon movable by means of wheels 40 on rails 41 and having a loading top 42 of a suitable length. The fodder container 37 is open at the bottom and, as in the embodiment of FIGS. 1 and 2, it is provided with gates 15–17 having lifting arms 18–20 and pulleys 21–23. The movable fodder table 42 is provided at the sides with projecting uprights 43, 44, 45 carrying at the top the adjustable bows 25–27 which are disposed at a relative distance corresponding to the width of the compartments 2. When the fodder table 42 passes beneath the fodder container 37 in the direction of the arrow (FIG. 3) the gates 15–17 on the said container are lifted to different levels so that portions of different sizes of the various kinds of fodder are discharged to the areas of the fodder table which are meant for the various animals. On the fodder table 42 there are mounted upwardly directed, articulated and spring actuated carriers 47, which bring along the fodder when the fodder table 42 passes beneath the fodder container 37. In the rear end wall of the fodder container there are vertical slots 48 through which the carriers pass. The length of these carriers is, of course, dependent on the height of the discharge opening, for which purpose they are adjustable as to their height.

The embodiments of the invention in which an exclusive property or privilege is claimed are defined as follows:

1. A feeding device comprising a fodder table and a fodder container mounted above said fodder table, said fodder table and fodder container being movable relative to one another, the fodder container being interiorly divided by partition walls into compartments each of which has a discharge opening at the bottom, vertical guide rails along the lower marginal portions of the compartments, gates vertically displaceable in said guide rails for closing and opening the discharge openings, and actuating means on the gates for actuating said gates to discharge predetermined amounts of predetermined kinds of fodder from said compartments as said table and container are moved relatively to one another to deposit the discharged fodder into compartments of said table formed by walls parallel to the longitudinal axis of the table.

2. A feeding device according to claim 1, in which said gate actuating means includes bent bars one end of each of which is connected to a gate and the other end of which is provided with a pulley and camming bows on which said pulleys ride in a predetermined path.

3. A feeding device according to claim 1, in which said container is provided at its lower end with a discharge opening extending past all compartments and formed in an outer container wall which is perpendicular to the longitudinal axis of the fodder table.

4. A feeding device according to claim 1, in which said gate actuating means includes U-shaped bows convex upwardly mounted atop uprights and providing predetermined camming surfaces, pulleys ridable on said surfaces and bars connected at one end to said pulleys and at their other end to said gates.

5. A feeding device according to claim 4, in which the camming surfaces are arranged progressively ascending levels outwardly from said container.

6. A feeding device according to claim 4, in which the camming surfaces are interrupted at a point intermediate their ends.

7. A feeding device according to claim 1, in which said fodder table is stationary, said fodder container is mounted on wheels and motive means drives said wheels.

8. A feeding device according to claim 7, in which an endless conveyor is mounted below said container and above said wheels and driven by said motive means.

9. A feeding device according to claim 1, in which said fodder table is movable and mounted on wheels and provided with projecting uprights atop which are camming bows arranged at distances corresponding to the widths of the container compartments.

References Cited in the file of this patent

UNITED STATES PATENTS

| | | |
|---|---|---|
| 2,536,621 | Arnold | Jan. 2, 1951 |
| 2,654,344 | Peterson et al. | Oct. 6, 1953 |
| 2,705,474 | Siciliano | Apr. 5, 1955 |
| 2,745,380 | Vanes | May 15, 1956 |
| 2,786,448 | McMaster | Mar. 26, 1957 |
| 2,797,663 | Bailey | July 2, 1957 |
| 2,807,234 | Middlen | Sept. 24, 1957 |
| 2,941,505 | Middlen | Jan. 21, 1960 |